2,894,990

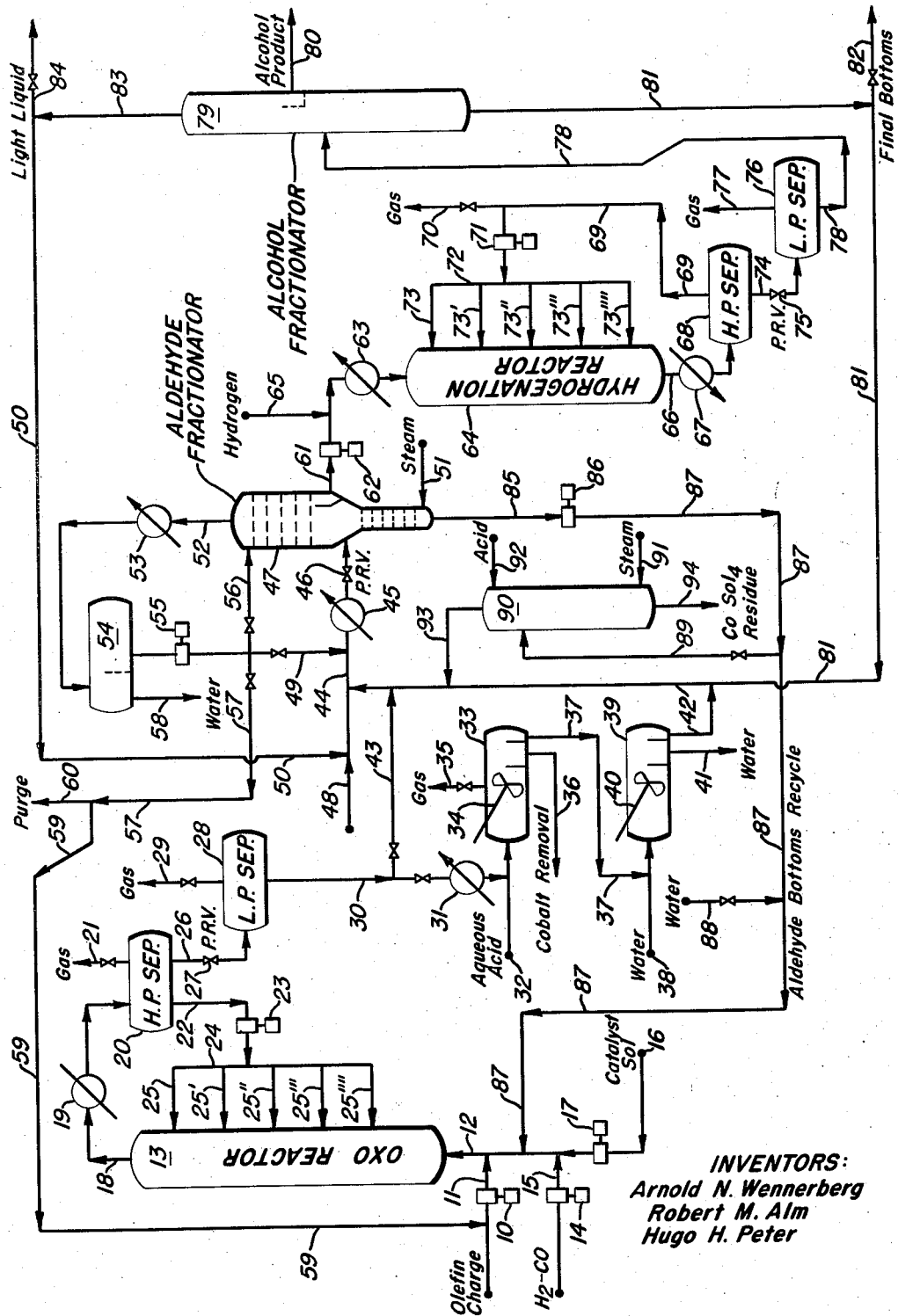

OXO PROCESS

Arnold N. Wennerberg, Chicago, Ill., Robert M. Alm, Crown Point, Ind., and Hugo H. Peter, Park Forest, Ill., assignors to Standard Oil Company, Chicago, Ill., a corporation of Indiana Application June 11, 1956, Serial No. 590,519

4 Claims. (Cl. 260—604)

This invention relates to an improved oxo process for the manufacture of high boiling alcohols from olefins and it pertains more particularly to improvements in product yields by substantially reducing losses to "bottoms" formation, particularly in the oxolation (formylation) step, and changing the character thereof.

The oxo process, e.g. as described in U.S. 2,638,488, has heretofore always produced substantial amounts of undesirable high boiling products commonly called "bottoms" in addition to the desired aldehydes and alcohols. If operated under conditions to obtain a high conversion per pass, the amount of bottoms may be as much as 30 percent or more of the total oxolation product. By careful control of conversion conditions and operating at lower conversion per pass, the amount of bottoms may be decreased to about 10 percent but heretofore there has always been substantial bottoms production. While there have been many proposals of schemes for utilizing such bottoms, they are much less valuable than the aldehyde and/or alcohol products. An object of this invention is to provide a method and means for substantially decreasing bottoms formation in the oxolation step and increasing the yield of aldehydes and alcohols produced. A further object is to provide a new integration of elements and procedural steps which will markedly improve the over-all efficiency of the oxo process. Other objects will be apparent from the following description.

It has been discovered that if the effluent liquid from an oxolation reactor is fractionated by flash-steam distillation at low pressure prior to the final hydrogenation step and bottoms from this fraction are recycled to the oxo reactor with added water in amounts of about 1 to 10 percent by weight based on recycled bottoms, there is not a buildup of high boiling material as would be expected, but that, on the contrary, the amount of high boiling components in the oxo reactor effluent is smaller than the amount obtained by bottoms recycle without water addition. Whether the recycled bottoms are reconverted into the desired products by hydrolysis or the presence of both water and bottoms in the oxo reactor inhibit formation of high boiling material is not known. It was found, however, in an extended operation of a commercial oxo plant for making isooctyl alcohols from heptenes, that when three-fourths of the bottoms from the aldehyde fractionator were recycled to the oxo reactor there was no corresponding increase in the amount of high boiling material in the oxo reactor effluent, there was a marked increase in the conversion of olefins to the desired aldehydes and alcohols, and the hydrolyzable portion of the bottoms was greatly increased.

During a part of the commercial demonstration of the invention the oxo reactor effluent was not decobalted prior to aldehyde fractionation so that cobalt was concentrated in the bottoms during fractionation and was recycled with said bottoms. Apparently the cobalt was in a less effective form than fresh cobalt catalyst solution since more fresh catalyst was required to maintain the desired conversion than would be expected in view of the amount of cobalt in the recycled bottoms. For precise control it is desirable to either remove the cobalt from oxo effluent prior to fractionation and/or to remove a minor portion of the oxo bottoms from the system in order to prevent any buildup of cobalt therein to undesirable levels while continuing the introduction of a precisely controlled amount of catalyst solution of known composition.

Where about 10 to 40 percent of the oxo bottoms are purged from the system for preventing cobalt buildup or for preventing buildup of high boiling material, cobalt can be recovered from said purged material and the purged material may be hydrolyzed with acid to recover still further amount of aldehyde and alcohol of desired boiling range, the recovered aldehydes and alcohols preferably being returned to the aldehyde fractionator. The combined features of oxo bottoms recycle with added water coupled with hydrolysis of purge material enables the losses in the system to be substantially eliminated or at least decreased up to about 90 percent of losses heretofore encountered.

Some high boiling material, usually not more than about 1 percent, may be carried with the heart-cut aldehyde stream into the hydrogenation reactor and some high boiling material may be formed during the hydrogenation or the final distillation steps so that a small amount of final bottoms must be separated from the finished alcohol product. When these final bottoms are recycled to the aldehyde fractionator, any retained alcohol is recovered therefrom and the remainder of the final bottoms may augment the oxo bottoms which are recycled to the oxo reactor. With this integrated operation it is necessary to remove or purge a small part of the aldehyde fractionator bottoms of the high boiling material since they will contain final bottoms which, in turn, apparently contain high boiling ethers or other components which cannot be totally recycled without buildup in the system.

Final product yields are also enhanced by careful control of the hydrogenation step to avoid reduction of alcohols to paraffins and by recycle of the overhead stream from the final fractionation to the aldehyde fractionation step. A part of the overhead from the aldehyde fractionation may be recycled to the oxo step but it is essential that a part of this stream be purged in order to prevent buildup of paraffins in the system.

The invention will be more clearly understood from the following detailed description of a specific example read in conjunction with the accompanying drawing which is a schematic flow diagram of a commercial plant for producing octyl alcohols.

While our invention is applicable to any oxo process employing an aliphatic olefin charge containing 3 to 15 or more carbon atoms per molecule, it will be described as applied to a conversion of a heptene stream which, after removal of lower boiling and higher boiling materials, is introduced by pump 10 and lines 11 and 12 into oxo reactor 13. A 1:1 hydrogen-carbon monoxide mixture is introduced into said reactor by compressor 14 and lines 15 and 12 although the ratio of hydrogen to carbon monoxide may, of course, vary to a considerable extent. A 6 percent solution of an oil-soluble cobalt salt such as cobalt tallate or cobalt naphthenate is introduced as a heptene solution from source 16 by pump 17 to line 12.

The oxo reactor is operated at a pressure of about 1500 to 4000, e.g. about 2500, p.s.i.g. at a temperature in the range of about 150 to 400° F., preferably about 300 to 330° F., with a liquid space velocity (volumes of fresh liquid charging stock per hour per volume of reactor space) of about .1 to 1.5, e.g. about .5, with about .01 to .2, e.g. about .1 weight percent, catalyst as cobalt and about 20 to 60 cubic feet of hydrogen-carbon monoxide gas per gallon of olefin charged.

The oxolation reactor effluent is withdrawn through line 18 through cooler 19 to high pressure separator 20 which preferably operates at about 100° F. and under substantially the same pressure as the reactor. While gases may be vented from the separator through line 21 it has been found that by properly controlling the rate of gas introduction by compressor 14, no appreciable amounts of gas require venting at this point. A part of the liquid condensate is returned by line 22, pump 23, manifold 24 and spaced inlet lines 25, 25', 25", 25'" and 25"" at spaced upper parts of the reactor for temperature control. That portion of the reactor between the bottom thereof and the lowermost liquid recycle line 25"" ordinarily does not require cooling since in this portion of the reactor the catalyst is being converted to cobalt hydrocarbonyl so that no cooling of this portion of the reactor is necessary.

The net liquid produced is withdrawn from separator 20 by line 26 through pressure-reducing valve 27 and introduced into low pressure separator 28 which is maintained at a pressure not higher than about 40 p.s.i. and preferably in the range of about 10 to 30 p.s.i. Most of the hydrogen and carbon monoxide is released from the liquid in this low pressure separation step and is withdrawn from the system through vent line 29. Vent line 29 may be provided with a cooler for preventing loss of condensable hydrocarbons or condensable material may be recovered from the vented gas in any known manner. If desired, a stripping gas may be introduced at the base of the low pressure separator to assist in the removal of hydrogen and carbon monoxide and thus decompose any cobalt hydrocarbonyl that may remain in the separated liquid.

Liquid from low pressure separator 28 is passed by line 30 through heat exchanger 31, aqueous acid such, for example, as 5 to 10 percent sulfuric acid is introduced from source 32 and the combined streams are then introduced into cobalt removal vessel 33 wherein the aqueous acid is intimately mixed with the liquid at a temperature of about 150° F. by stirrer 34. Any remaining gases may be vented through line 35 and if hydrogen and carbon monoxide were not stripped in low pressure separator 28, such stripping may be effected in the cobalt-removing vessel 33. While it is preferred to employ an aqueous acid for removing cobalt from the product liquid at this point, most of the cobalt may be removed from the liquid by simply introducing water from source 32. The aqueous cobalt containing liquid is withdrawn from the system through line 36 and cobalt may be recovered from the withdrawn stream in any known manner. The decobalted solution is withdrawn through line 37 and introduced together with water from source 38 into wash vessel 39 provided with mixer 40, and additional aqueous stream containing some cobalt being withdrawn through line 41 and the decobalted stream being withdrawn through line 42 for fractionation. The water washing step is not always necessary and, in fact, if cobalt is removed with purged bottoms it is unnecessary to effect decobalting at this stage in which case liquid from low pressure separator 28 may be introduced directly through line 43 to line 42.

The stream from line 42 is introduced by line 44, heater 45 and pressure-reducing valve 46 into flash distillation vessel fractionator 47 together with steam from source 48 and recycled hydrocarbons from line 49 and preferably with recycled light ends from line 50. The combined stream is preheated by exchanger 45 to about 200° F. and fractionator 47 is operated at a pressure of about 200 millimeters mercury. That portion of the fractionator which is above the feed inlet is preferably of larger diameter than the portion below the feed inlet since it is desirable to effect as much flash distillation as possible. Stripping steam is introduced at the base of the narrowed section of fractionator 47 through line 51 at a temperature to maintain the bottom temperature in the fractionator about 290° F. Overhead from the fractionator passes by line 52 through condenser 53 to receiver 54 from which condensed liquid is withdrawn by pump 55, one part of the liquid being returned through line 56 as reflux, another part being introduced by line 49 to line 44 and the remainder being withdrawn through line 57. A part of this remainder may be recycled by line 59 to olefin inlet line 11 in which case the condensed olefin forms a part of the fresh olefin charged. It is essential, however, that at least a part of the stream from line 57 be purged through line 60 in order to prevent paraffin buildup. Water is removed from receiver 54 by line 58.

The heart-cut $C_8$ aldehyde-alcohol fraction is withdrawn from the fractionator through line 61 and pumped by pump 62 through heater 63 to hydrogenation vessel 64 together with the required amount of hydrogen introduced by line 65. The hydrogenation may be effected with known catalysts under known conditions (see 2,638,487–8).

The hydrogenation reactor effluent is withdrawn through line 66 to cooler 67 to high pressure separator 68 from which separated gas is withdrawn through line 69, a part of this gas being vented through line 70 and another part being returned by compressor 71 through manifold 72 and lines 73, 73', 73", 73'" and 73"" to spaced points in the reactor for obtaining the desired temperature control.

The hydrogenated stream is withdrawn from separator 68 by line 74 and pressure-reducing valve 75 to low pressure separator 76 from which gas is vented through line 77. After hydrogen separation the liquid may be caustic-washed at about 100° F., e.g. with 15 percent KOH solution, for the removal of formate esters and the caustic-washed solution may then be water-washed in equipment similar to that employed for acid and water-washing of oxo reactor effluent. The liquid is then introduced by line 78 to the alcohol fractionation system diagrammatically illustrated by tower 79, the desired alcohol product stream being withdrawn through line 80. The material higher boiling than the desired alcohol may be recycled by line 81 to line 42 and thence back to aldehyde fractionator 47 although it is preferred that the final bottoms be withdrawn from the system through 82 unless hydrogenation is effected under conditions to substantially avoid formation of high boiling ethers. Products lower boiling than the desired alcohol are taken overhead through line 83 and are preferably recycled by line 50 to the aldehyde fractionator 47 although, if desired, the light ends may be removed through line 84. Usually two separate fractionating towers will be employed instead of a single column; the bottoms may be removed from the hydrogenated product in the first column and the overhead from the first column introduced to a second column for removing low boiling material or, alternatively, the low boiling material may be removed from the hydrogenated stream in a first column and the bottoms from the first column may be introduced into a second column for separating alcohol from final bottoms.

Heretofore about 10 to 30 percent of the oxo product stream was withdrawn from the aldehyde fractionator 47 through line 85 and discarded as "bottoms." Many efforts have been made to utilize such bottoms but they are much less valuable than the desired alcohols and in some cases such bottoms have even been burned as fuel. In accordance with our invention, a large part (preferably about 50 to 90 percent) of the bottoms withdrawn from the aldehyde fractionator through line 85 is recycled by pump 86 and line 87 to line 12 and oxo reactor 13 together with about 1 to 10 weight percent (based on recycled bottoms) of water added through line 88. The remaining 10 to 40 or 50 percent of the total aldehyde bottom stream is introduced by line 89 at an intermediate or upper level in a steam distillation-hydrolysis column 90 into which steam is introduced through line 91. An acidic material, such as dilute sulfuric acid, may either be introduced directly into line 89 or into the top of tower 90 through line 92 in an amount sufficient to bring the pH of the material to below 5 and preferably below 1. Any non-volatile, acidic material may be employed for this purpose which does not decompose or cause oxidation or in any way contaminate the stream which is taken overhead from column 90. By steam distilling the purged bottoms and simultaneously maintaining a low pH, preferably below 1, most of the bottoms are hydrolyzed to form $C_8$ aldehydes and alcohols which are carried overhead by line 93 which may discharge to line 42 for introducing the overhead material into aldehyde fractionator 47 or which, after separation of condensed water, may be directly introduced into hydrogenation reactor 64. The bottoms removed from steam distillation-treating vessel 90 may be removed by line 94 and separated into an aqueous phase from which cobalt may be recovered and a very small amount of a residue phase which may consist largely of high boiling ethers and other unidentified by-product materials. By employing the above-described bottoms recycle with added water to the oxo reactor and steam distilling purge material at low pH, losses to bottoms are substantially eliminated or at least reduced to a very small proportion of losses heretofore encountered and the yield of high quality alcohol is correspondingly increased.

The addition of water to the recycled bottoms stream not only serves to minimize bottoms formation but it also serves to cause such bottoms as are formed to be largely of a hydrolyzable rather than inert form. This fact is demonstrated by the following series of tests made with a $C_7$ olefin charge in a batch reactor (bomb) at a pressure of 3,000 p.s.i.g., an $H_2$:CO ratio of 1:1, a temperature in the range of 325 to 360° F., a time period of 1 hour with .1 weight percent cobalt in the form of cobalt tallates as catalyst. The reactants were charged to the evacuated bomb at room temperature and the bomb was pressured to about 2,000 p.s.i.g. with the $H_2$—CO gas and then heated to about 315° F. to initiate the reaction. As soon as the reaction was initiated, the pressure was increased to approximately 3,000 p.s.i.g. and was maintained at this level by replenishing the $H_2$:CO gas consumed. The bomb was a stainless steel vessel of 1700 ml. capacity and the $C_7$ olefin charge in each case was about 7,000 grams or 1,000 ml. The effects of various amounts of added water was found to be as follows:

| Run | Wt. Percent $H_2O$ Based on Recycled Bottoms [1] | Prod. Dist'n., Mole Percent as $C_7=$ | | | Bottoms Type | |
| --- | --- | --- | --- | --- | --- | --- |
| | | HC | A+A | Bttms. | Inert, Wt. percent | Hydrolyzable, Wt. Percent |
| A | 0 | 21 | 64 | 15 | 59 | 41 |
| B | 2.67 | 22.5 | 68 | 9.5 | 33 | 67 |
| C | 5.20 | 25 | 66 | 9 | 16 | 84 |
| D | 10.45 | 25.5 | 65 | 9.5 | 16 | 84 |
| E | 27.0 | 28.5 | 64.5 | 7 | 17 | 83 |

[1] Based on commercial operation with bottoms level of 20% with 75% recycle.

The foregoing data show that in the absence of added water 15 percent of the olefins were converted to bottoms and only 64 percent to alcohol plus aldehyde. With 2.67 weight percent of added water based on recycled bottoms, the bottoms formation was reduced to 9.5 percent and the alcohol plus aldehyde formation was increased to 68 percent. For maximum alcohol plus aldehyde and minimum bottoms, the amount of water in test B appeared optimum. However, the presence of the water had an additional and unexpected effect of changing the nature of the bottoms produced. With no added water, only 41 percent of the bottoms were hydrolyzed to alcohol plus aldehyde. With 5.2 percent of added water, 84 percent of the bottoms were hydrolyzable. Taking into account both the reduced bottoms formation and the conversion of bottoms to hydrolyzable form, it is thus shown that the amount of water present should preferably be in the range of about 2 to 6 percent which requires the addition of about 1 to 5 percent of water through line 88 since the amount of water in the bottom stream itself is usually below 1 percent by weight. Since a low pH is desirable in an oxo reactor, the added water may be acidulated with any acid which will not be detrimental to the reaction or lead to corrosion difficulties, octanoic acid in this case being a preferred acidulating agent.

The remarkable advantages of our invention have also been demonstrated in a commercial plant of the type hereinabove described. In this plant operation the oxolation effluent was first decobalted by depressuring and washing with warm water and then fractionated. Average data obtained in operations with and without water addition to recycled bottoms are as follows:

| | No $H_2O$ Addition | Water Addition |
| --- | --- | --- |
| $H_2O$, vol. percent on recycled bottoms | 0 | 3.4 |
| Fresh feed, B./Hour | 14.05 | 12.65 |
| Overhead recycle, B./Hour (line 59) | 5.25 | 7.01 |
| Bottoms recycle, B./Hour (line 87) | 1.0 | 1.4 |
| Fresh cobalt, wt. percent on total feed | 0.038 | 0.041 |
| Reactor pressure, p.s.i.g | 1,880 | 1,955 |
| Reactor temp., °F | 341 | 363 |
| Net bottoms yield, vol. percent on fresh feed | 5.3 | 4.0 |
| Hydrolyzable bottoms content, percent of true bottoms | 9.0 | 31.0 |

(Higher water contents cause uneven operation.)

It is thus clearly demonstrated that 3.4 volume percent of water based on recycle bottoms not only decreases bottoms formation but causes such bottoms as are formed to contain a substantially higher proportion of hydrolyzable components.

While a specific example of the invention has been described in considerable detail it should be understood that the invention is not limited thereto, that the invention is applicable to the production of other high boiling alcohols and particularly high boiling alcohols of the $C_8$ to $C_{16}$ range, and that alternative arrangements and operating conditions will be apparent from the above description to those skilled in the art. It may be advantageous to use a known surfactant or wetting agent with the water to improve contact between the organic and aqueous phases; such a surfactant is preferably of the acidic or non-ionic type or any surfactant which does not itself undergo chemical change in use and which is preferably not steam distillable.

We claim:
1. In an oxo process wherein an olefin having 7 to 15 carbon atoms per molecule is reacted with a carbon monoxide-hydrogen gas in the presence of an oil-soluble cobalt catalyst in a continuous up-flow oxolation zone under oxolation conditions to form oxo aldehydes and high boiling materials and wherein said high boiling materials are separated from oxo aldehydes leaving the oxolation reaction zone by flash-steam distillation at low subatmospheric pressure, the material leaving the flash-steam distillation as bottoms comprising about 20 percent of the total stream charged to said flash-steam distillation the improved method of operation which comprises recycling about three-fourths of said high boiling materials to the oxolation zone with added water in an amount in the range of about 1 to 5 percent by weight based on recycled high boiling materials wherein the amount of produced alcohol and aldehyde is increased, the amount of bottoms production is decreased and the amount of hydrolyzable material in the bottoms is increased over the amounts respectively which are obtained by aldehyde recycle with the absence of added water.

2. The method of claim 1 which includes the step of steam distilling that portion of the high boiling materials which is not recycled to the oxolation zone in order to effect hydrolysis thereof.

3. The method of claim 2 wherein the steam distillation of unrecycled bottoms is effected in the presence of a non-volatile acid.

4. The method of claim 2 wherein the steam distillation of unrecycled bottoms is effected at a pH below 1.

References Cited in the file of this patent

UNITED STATES PATENTS

| | | |
|---|---|---|
| 2,437,600 | Gresham | Mar. 9, 1948 |
| 2,440,109 | Moore | Apr. 20, 1948 |
| 2,564,130 | Schreyer | Aug. 14, 1951 |
| 2,576,113 | Hagemeyer | Nov. 27, 1951 |
| 2,688,591 | Hill | Sept. 7, 1954 |
| 2,691,047 | Hagemeyer | Oct. 5, 1954 |
| 2,697,731 | Nagel | Dec. 21, 1954 |
| 2,744,939 | Kennel | May 8, 1956 |

FOREIGN PATENTS

| | | |
|---|---|---|
| 692,624 | Great Britain | June 10, 1953 |
| 702,195 | Great Britain | Jan. 13, 1954 |

OTHER REFERENCES

Holm et al.: "Oxo Process," Fiat Final Report No. 1000, Pb–81383 (Dec. 26, 1947); pp. 20–4, 34, 72.

Meyer: "Oxo Process," Translation PC-S-V, Charles A. Meyer and Co., Grand Central Terminal Bldg., 25 Vanderbilt Ave., N.Y., N.Y., 1948 (available to public March 12, 1946); Pb–71337; pp. 10, 11, 35, 36, 37.